(12) United States Patent
Oiwa et al.

(10) Patent No.: US 11,539,263 B2
(45) Date of Patent: Dec. 27, 2022

(54) ROTARY CONNECTOR DEVICE AND METHOD OF ASSEMBLING ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Kento Oiwa, Inukami-gun (JP); Hirofumi Utsunomiya, Inukami-gun (JP); Masatoshi Ushiyama, Inukami-gun (JP); Masashi Kanazawa, Inukami-gun (JP); Kosuke Sato, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 376 days.

(21) Appl. No.: 16/840,461

(22) Filed: Apr. 6, 2020

(65) Prior Publication Data
US 2020/0235632 A1   Jul. 23, 2020

Related U.S. Application Data

(63) Continuation of application No. PCT/JP2018/037136, filed on Oct. 4, 2018.

(30) Foreign Application Priority Data

Oct. 6, 2017   (JP) .............................. JP2017-196221

(51) Int. Cl.
*H02K 5/22*   (2006.01)
*B62D 1/04*   (2006.01)
*H01R 35/04*  (2006.01)

(52) U.S. Cl.
CPC ............... *H02K 5/225* (2013.01); *B62D 1/04* (2013.01); *H01R 35/04* (2013.01)

(58) Field of Classification Search
CPC .......... H02K 5/225; B62D 1/04; B62D 15/02; B62D 15/022; B60R 16/027; H01R 35/04
See application file for complete search history.

(56) References Cited

U.S. PATENT DOCUMENTS

| | | | | |
|---|---|---|---|---|
| 5,242,309 | A * | 9/1993 | Hasegawa | B60R 16/027 439/15 |
| 2004/0209505 | A1 * | 10/2004 | Wade | B60R 16/027 439/164 |
| 2019/0372287 | A1 * | 12/2019 | Yamanishi | B62D 15/0215 |

FOREIGN PATENT DOCUMENTS

| | | |
|---|---|---|
| CN | 105375222 | 3/2016 |
| JP | 60-124078 U | 8/1985 |

(Continued)

OTHER PUBLICATIONS

Written Opinion for corresponding International Application No. PCT/JP2018/037136, dated Dec. 11, 2018.

(Continued)

*Primary Examiner* — Travis S Chambers
(74) *Attorney, Agent, or Firm* — Mori & Ward, LLP

(57) ABSTRACT

A rotary connector device body in which a rotator and a stator are assembled so as to be relatively rotatable has a housing space that can house an FFC inside. The rotary connector device body has a viewing window that is a through hole through which the housing space is viewed from outside of the rotary connector device body, a cover member disposed at the viewing window so as to cover the viewing window, an outer regulating portion facing outside of the rotary connector device body and disposed so as to be able to contact an outer surface of the cover member, and an inner regulating portion facing the housing space and dis- (Continued)

posed so as to be able to contact an inner surface of the cover member. The cover member is disposed between an outer regulating portion and an inner regulating portion.

20 Claims, 12 Drawing Sheets

(56) References Cited

FOREIGN PATENT DOCUMENTS

| JP | 61-164079 U | 10/1986 |
|---|---|---|
| JP | 2006-217730 | 8/2006 |
| JP | 2007-136017 | 6/2007 |
| JP | 2010-146943 | 7/2010 |

OTHER PUBLICATIONS

Chinese Office Action for corresponding CN Application No. 201880064582.6, dated Oct. 30, 2020 (w/ English machine translation).
Japanese Office Action for corresponding JP Application No. 2019-547002, dated Apr. 12, 2022 (w/ English machine translation).
Extended European Search Report for corresponding EP Application No. 18864864.6-1201, dated May 26, 2021.
International Search Report for corresponding International Application No. PCT/JP2018/037136, dated Dec. 11, 2018.

* cited by examiner

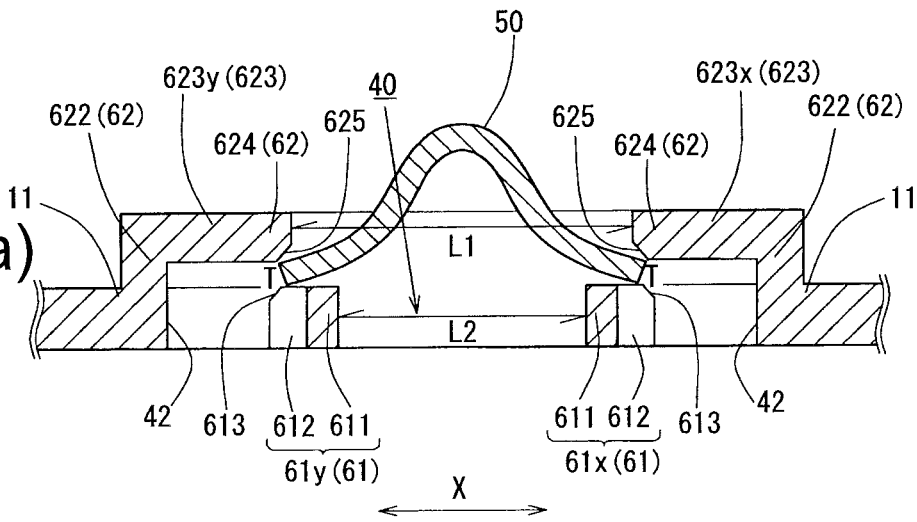
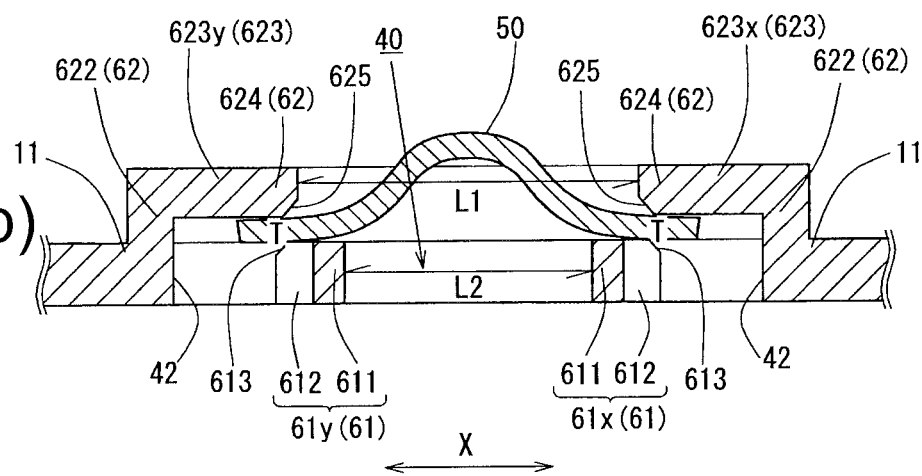
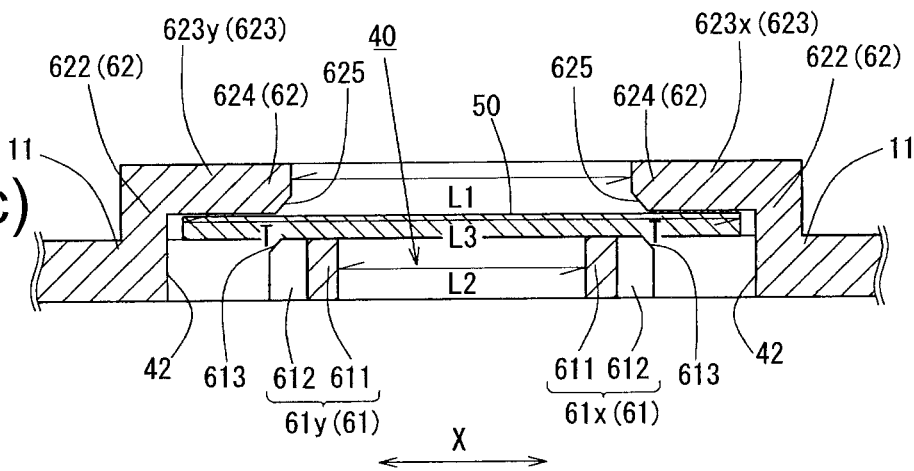

ROTARY CONNECTOR DEVICE AND METHOD OF ASSEMBLING ROTARY CONNECTOR DEVICE

CROSS-REFERENCE TO RELATED APPLICATION

The present application is a continuation application of International Application No. PCT/JP2018/037136, filed Oct. 4, 2018, which claims priority to Japanese Patent Application No. 2017-196221 filed Oct. 6, 2017. The contents of these applications are incorporated herein by reference in their entirety.

BACKGROUND OF THE INVENTION

Technical Field

The present invention relates to a rotary connector device and a method of assembling the rotary connector device.

Discussion of the Background

A rotary connector device mounted on a vehicle such as an automobile is mainly configured such that a fixed body fixed to a vehicle body and a rotating body to which a steering wheel is mounted are coaxially assembled so as to be relatively rotatable. In a housing space formed by the fixed body and the rotating body, a flexible flat cable (hereinafter referred to as FFC) is housed so as to be able to be fastened and unwound following a rotation of the steering wheel.

In this rotary connector device, when the rotary connector device is assembled to a vehicle body or a steering wheel is assembled, the rotating body relatively rotates with respect to the fixed body, and the rotary connector device may come off from a neutral position. In this case, the FFC is wound in an unbalanced manner. In a case where the rotary connector device and the steering wheel are assembled while the neutral position of the rotary connector device and a neutral position in a rotational direction of the steering wheel are deviated as described above, the FFC is not sufficiently long for the steering wheel to be rotated by a desired number of rotations when the steering wheel is steered in a predetermined rotational direction.

In order to solve such a problem, various rotary connector devices that can confirm whether the rotary connector devices are at a neutral position have been proposed. For example, JP 2010-146943 A discloses a rotary connector device in which a viewing window through which a housing space is visually confirmed from outside of the device is provided on a rotating side ring plate that is a top plate of the rotary connector device, and a transparent cover member is affixed so as to cover the viewing window.

According to the rotary connector device disclosed in JP 2010-146943 A, the transparent cover member provided with an adhesive layer is affixed so as to cover the viewing window provided on the rotating side ring plate. The FFC wound around the housing space can be therefore viewed through the viewing window from outside of the device. Therefore, a marker indicating the neutral position attached to the FFC can be visually confirmed from outside of the device, and it can be confirmed that the rotating body is at the neutral position.

However, since the transparent cover member is provided with the adhesive layer, foreign matter and dust may adhere to the adhesive layer before attaching the cover member to the viewing window, and visibility of the viewing window may be reduced.

SUMMARY OF THE INVENTION

According to one aspect of the present invention, an embodiment is a rotary connector device assembling a rotating body and a fixed body so as to be relatively rotatable, the rotating body having a rotating side ring plate in an annular shape and an inner peripheral cylinder portion in a cylindrical shape that is formed at an inner peripheral edge of the rotating side ring plate, the fixed body having a fixed side ring plate in an annular shape and an outer peripheral cylinder portion in a cylindrical shape that is formed at an outer peripheral edge of the fixed side ring plate, and having a housing space inside, the rotary connector device including a viewing window that is a through hole through which the housing space is viewed from outside of the rotary connector device, a cover member disposed at the viewing window so as to cover the viewing window and being transparent and flexible, an outer regulating portion facing toward outside of the rotary connector device and disposed so as to contact an outer surface of the cover member, and an inner regulating portion facing the housing space and disposed so as to be able to contact an inner surface of the cover member, in which the cover member is disposed between the outer regulating portion and the inner regulating portion.

Further, according to another aspect of the present invention, another embodiment is a method of assembling a rotary connector device including the steps of assembling a rotating body and a fixed body to be relatively rotatable so as to have a housing space inside, providing a viewing window that is a through hole through which the housing space is viewed from outside of the rotary connector device, providing an outer regulating portion and an inner regulating portion on a periphery of the viewing window, and passing a cover member that is transparent and flexible through the outer regulating portion while being deflected to arrange the cover member between the outer regulating portion and the inner regulating portion so as to cover the viewing window, in which the regulating portion can contact an outer surface of the cover member facing toward outside of the rotary connector device, and the inner regulating portion can contact an inner surface of the cover member facing the housing space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 5(*a*) to 5(*c*) are explanatory diagrams of an assembling method of assembling the cover member to the viewing window in the first embodiment.

DESCRIPTION OF THE EMBODIMENTS

Figure 1:
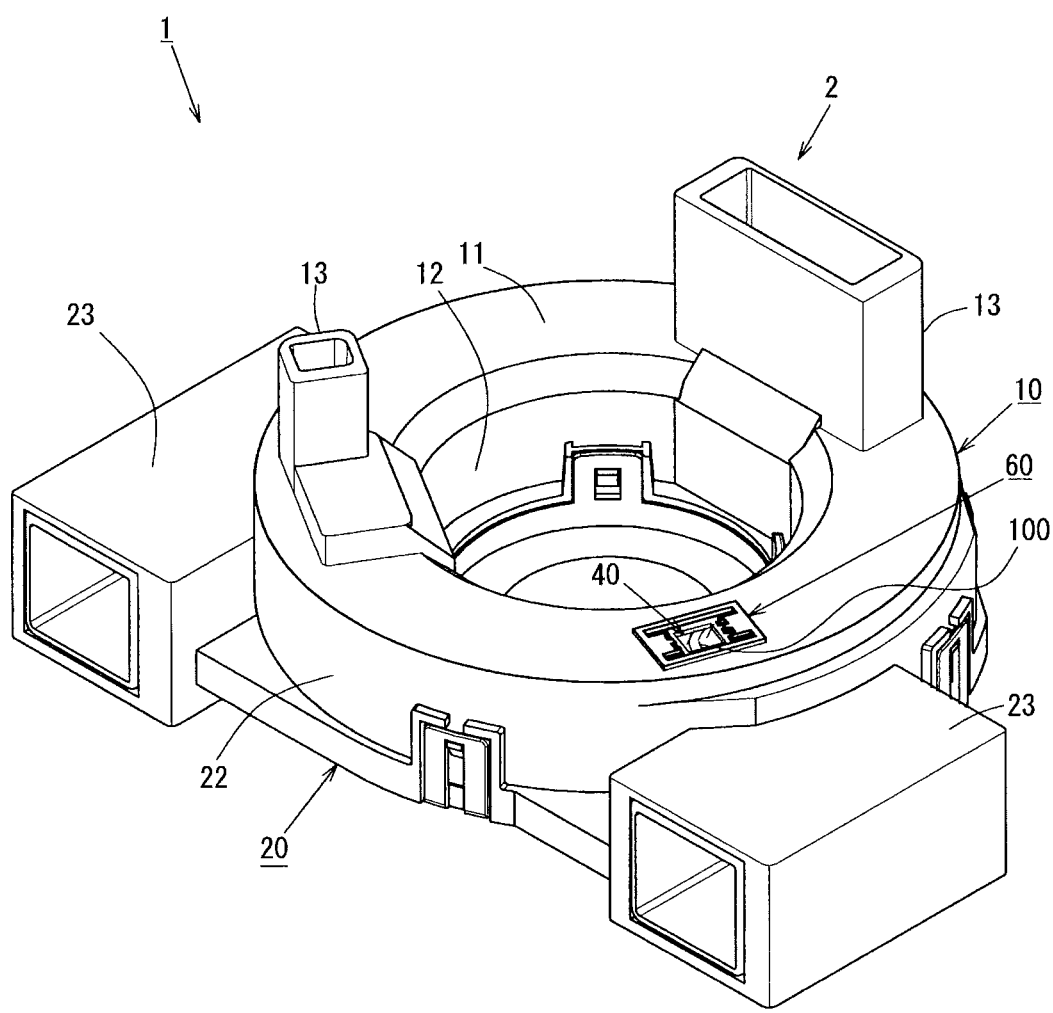
FIG. 1 is a schematic perspective view of a rotary connector device according to a first embodiment.

The embodiments will now be described with reference to the accompanying drawings, wherein like reference numerals designate corresponding or identical elements throughout the various drawings.

First Embodiment

A rotary connector device body 2 and an assembling method of assembling a cover member 50 to a viewing window 40 provided in the rotary connector device body 2 according to a first embodiment of the present invention will be described with reference to FIGS. 1 to 5(c).

Figure 2:
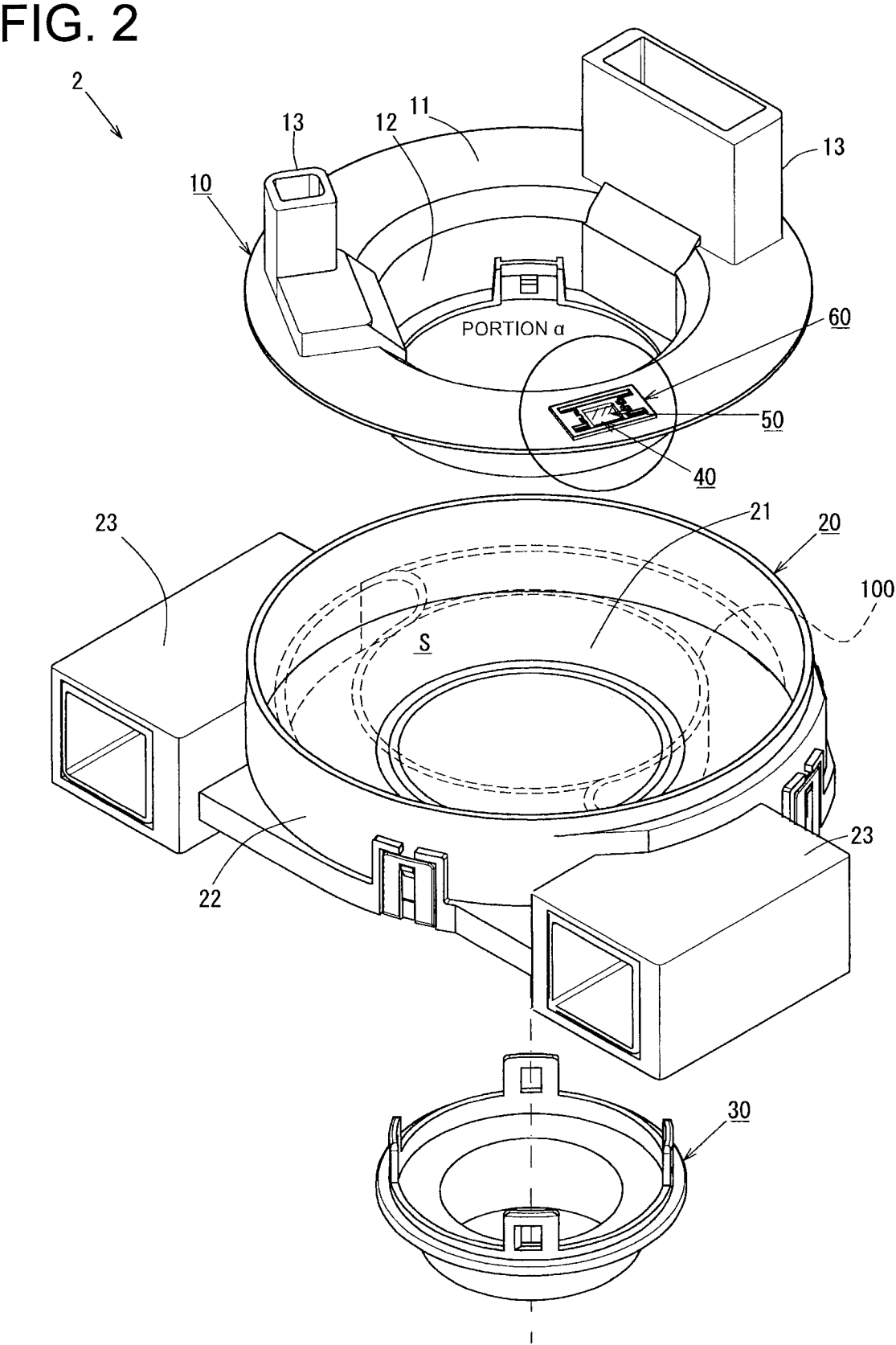
FIG. 2 is a schematic exploded perspective view of the rotary connector device according to the first embodiment.

FIG. 1 is a schematic perspective view of the rotary connector device 1, and FIG. 2 is a schematic exploded perspective view of the rotary connector device 1. Here, a direction of a rotator 10 with respect to a stator 20 is upward, and a direction of a sleeve 30 with respect to the stator 20 is downward.

Figure 3:
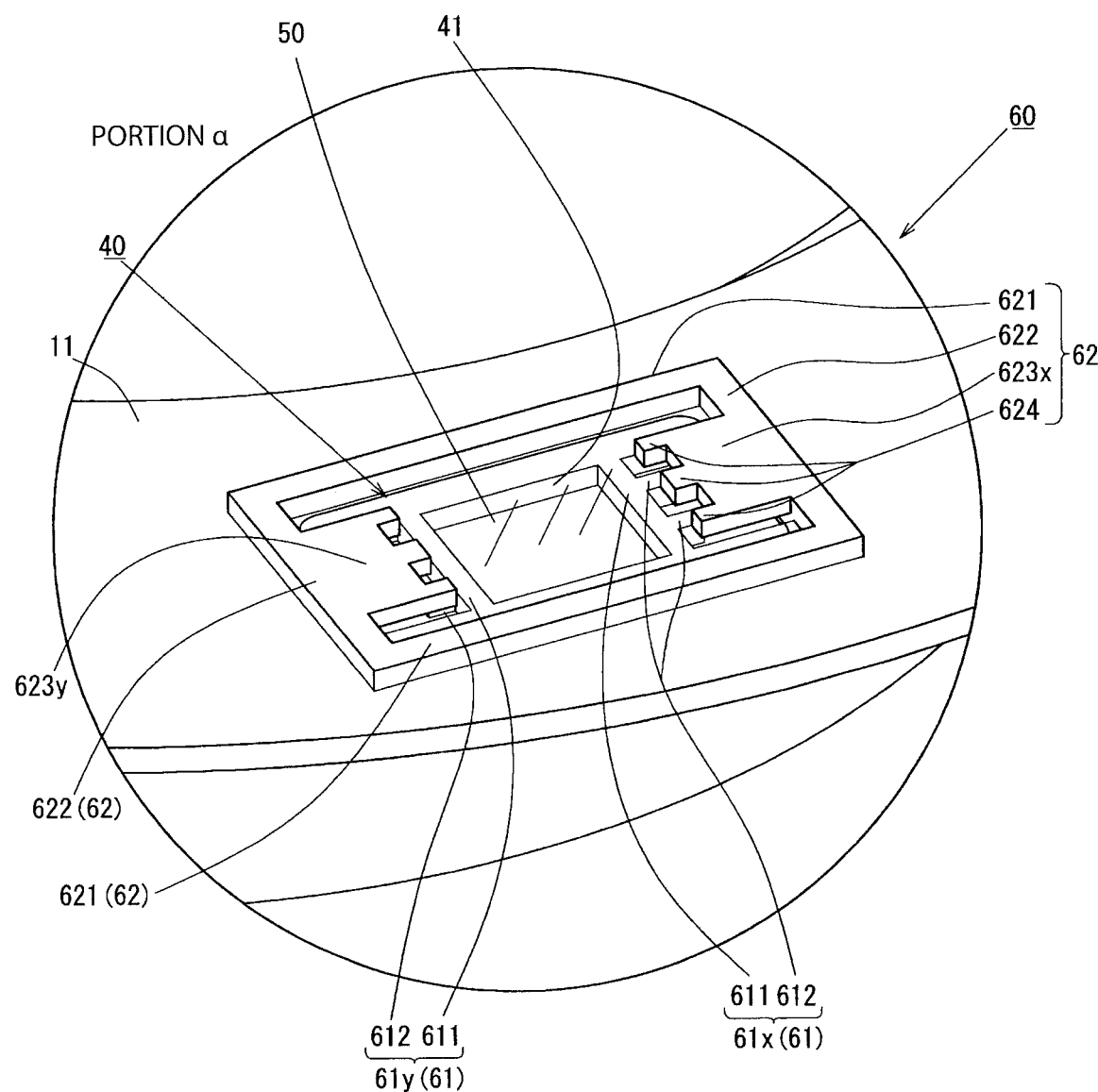
FIG. 3 is an enlarged schematic perspective view of a portion α in FIG. 2.
Figure 4A:
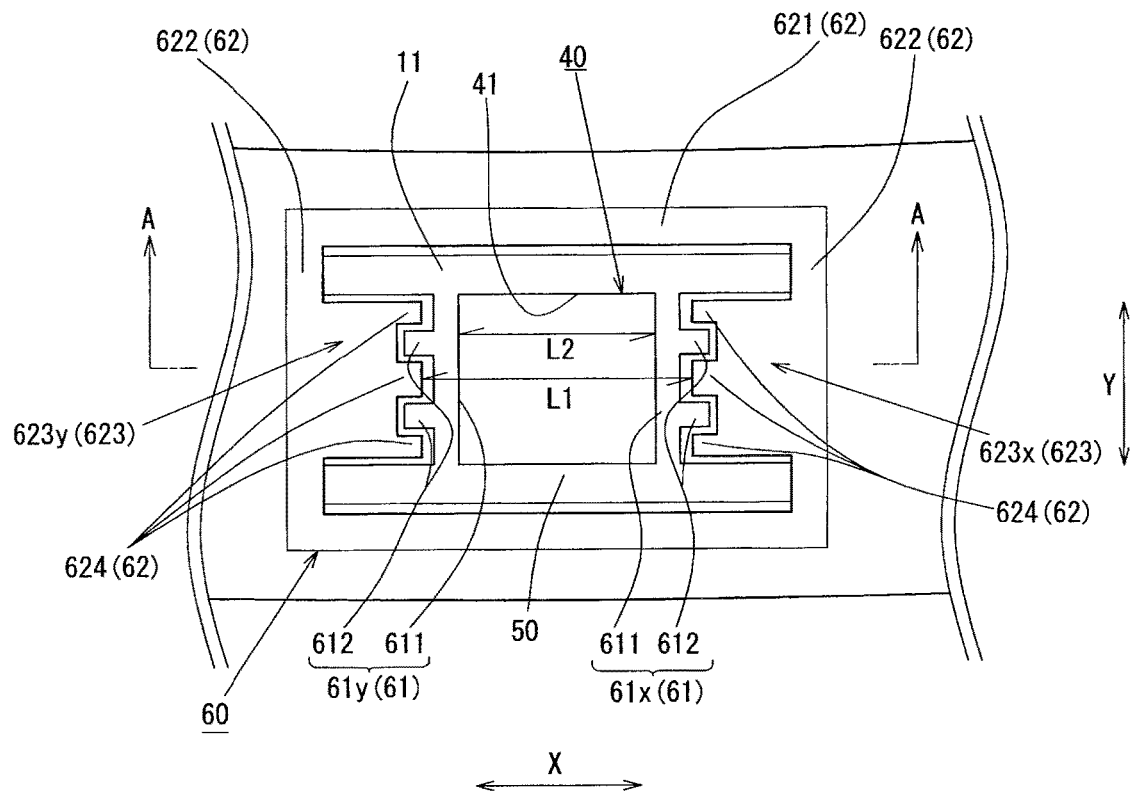
FIGS. 4(*a*) and 4(*b*) are explanatory diagrams of a cover member holding portion that holds a cover member against a viewing window in the first embodiment.
Figure 4B:
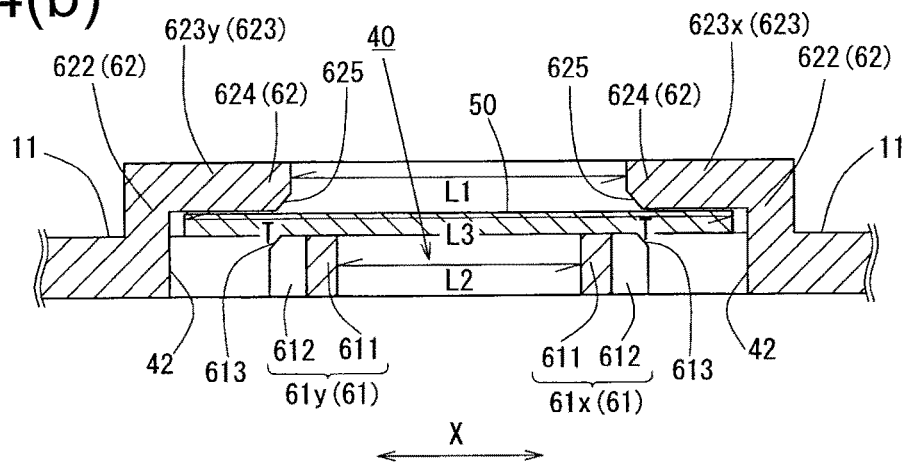

FIG. 3 is an enlarged schematic perspective view of a portion α in FIG. 2. FIGS. 4(a) and 4(b) are explanatory diagrams of a cover member holding portion 60 that holds the cover member 50 against the viewing window 40. FIGS. 5(a) to 5(c) are explanatory diagrams of the assembling method of assembling the cover member 50 to the viewing window 40.

Specifically, FIG. 4(a) is a plan view of the viewing window 40 to which the cover member 50 is assembled, and FIG. 4(b) is a cross-sectional view taken along the line A-A in FIG. 4(a).

The rotary connector device 1 is configured by assembling a flexible flat cable 100 (hereinafter, referred to as FFC 100) to the rotary connector device body 2.

As shown in FIGS. 1 and 2, the rotary connector device body 2 is configured by the rotator 10, the sleeve 30 located below the rotator 10 and assembled with the rotator 10, and the stator 20 assembled by interposing between the rotator 10 and the sleeve 30 so as to relatively rotate. The FFC 100 can be accommodated in a housing space S formed inside the rotary connector device body 2 by the rotator 10 and the stator 20.

As shown in FIG. 2, the rotator 10 configuring the rotary connector device body 2 is integrally configured by a substantially annular rotating side ring plate 11 having a substantially circular through hole in a central portion in plan view, and an inner peripheral cylinder portion 12 formed downward from an inner peripheral edge of the rotating side ring plate 11.

The viewing window 40 communicating from outside of the rotary connector device body 2 to the housing space S is provided on a top surface of the rotating side ring plate 11. The transparent and flexible cover member 50 is assembled to the viewing window 40 (see FIG. 3).

In addition, two rotator-side connectors 13 that rotate integrally with a rotation of the rotator 10 are provided on the top surface of the rotating side ring plate 11. The rotator-side connectors 13 are housing portions that house a connection connector attached to one end of the FFC 100 housed in the housing space S. A connector of a cable (not shown) connected to an electric circuit of an external device such as a horn switch and an airbag unit disposed on a steering wheel is externally connected to the rotator-side connectors 13.

As shown in FIG. 2, the sleeve 30 assembled with the rotator 10 configured as described above is a substantially cylindrical body having a through hole vertically penetrating at a central portion in plan view. The sleeve 30 is assembled by vertically interposing a stator 20 to be described later with the rotator 10 and thus allows the rotator 10 and the stator 20 to relatively rotate clockwise and counterclockwise around a central axis of the rotating side ring plate 11 in plan view as a rotation axis.

The stator 20 rotatable relative to the rotator 10 is a bottomed substantially cylindrical body having an open top surface, and is configured by a fixed side ring plate 21 configuring a bottom surface, and a substantially cylindrical outer peripheral cylinder portion 22 configuring an outer peripheral surface, and two stator-side connector housing portions 23 protruding outward from the stator 20.

In this embodiment, the number of the rotator-side connectors 13 and the number of the stator-side connector housing portions 23 are two. However, the numbers are not limited thereto and can be adjusted as appropriate.

The fixed side ring plate 21 is an annular plate-like body having an outer diameter slightly larger than an outer diameter of the rotating side ring plate 11 and having a substantially circular through hole in a central portion in plan view.

The outer peripheral cylinder portion 22 is a cylindrical outer peripheral wall extending upward from an outer peripheral edge of the fixed side ring plate 21.

Each of the stator-side connector housing portions 23 is a housing portion that houses a connection connector attached to the other end of the FFC 100 housed in the housing space S, and is formed so as to be connectable to an external connector of the combination switch side or an instrument panel side.

The rotator 10 and the stator 20 configured as described above form the housing space S that houses the FFC 100 by the rotating side ring plate 11 and the inner peripheral cylinder portion 12 and by the fixed side ring plate 21 and the outer peripheral cylinder portion 22.

Next, the viewing window 40 provided on the top surface of the rotating side ring plate 11, the cover member 50 assembled to the viewing window 40, and the cover member holding portion 60 that holds the cover member 50 against the viewing window 40 will be described on the basis of FIGS. 3, 4(a), and 4(b).

As shown in FIGS. 3, 4(a), and 4(b), the viewing window 40 is a rectangular window that vertically penetrates the rotating side ring plate 11. The viewing window 40 is formed by longitudinal window frames 41 extending along a longitudinal direction X of the viewing window 40 and transverse window frames 42 extending along a transverse direction Y.

Here, the longitudinal direction of the viewing window 40 is referred to as the longitudinal direction X, and the transverse direction of the viewing window 40 is referred to as the transverse direction Y. The longitudinal direction X is a tangential direction to a radial direction of the rotating side ring plate 11 at a center of the viewing window 40 in the longitudinal direction X. The transverse direction Y refers to a direction orthogonal to the longitudinal direction X in plan view.

Further, an inner side in the longitudinal direction X refers to a direction toward the viewing window 40 along the longitudinal direction X, and an outer side in the longitudinal direction X refers to a direction away from the viewing window 40 along the longitudinal direction X. The inner side in the transverse direction Y refers to a radial direction inner side of the rotating side ring plate 11 in the transverse direction Y, and an outer side in the transverse direction Y refers to a radial direction outer side of the rotating side ring plate 11 in the transverse direction Y.

The cover member 50 is a transparent and flexible resin plate-like body, and is configured to have a thickness that is substantially the same as a height between bottom surfaces of outer regulating portions 623 to be described later and the top surface of the rotating side ring plate 11. A length of the cover member 50 in the transverse direction Y is configured to be longer than a corresponding length of the viewing window 40, and a length in the longitudinal direction X is sufficiently longer than a distance between connecting portions 611 to be described later.

As shown in FIGS. 3, 4(*a*), and 4(*b*), the cover member holding portion 60 is configured by inner regulating portions 61 provided in the inner side of the viewing window 40 and an outer holding portion 62 provided in the outer side of the viewing window 40 in the longitudinal direction X.

The inner regulating portions 61 have a first inner regulating portion 61*x* and a second inner regulating portion 61*y* disposed to face each other with respect to the viewing window 40. A second shortest distance L2 between the first inner regulating portion 61*x* and the second inner regulating portion 61*y* is configured to be shorter than a length L3 of the cover member 50 that faces the second shortest distance L2 when the cover member 50 is disposed at the viewing window 40.

As shown in FIGS. 4(*a*) and 4(*b*), the inner regulating portions 61 are configured by the connecting portions 611 connecting the longitudinal window frames 41 along the transverse direction Y in the inner side of the viewing window 40, and two inner protrusions 612 protruding from the connecting portions 611 toward the outer side in the longitudinal direction X. An inner guide 613 configured by a tapered surface that tapers toward the outer side in the longitudinal direction X is provided on the outer side in the longitudinal direction X of the top surface of the inner protrusions 612. The connecting portions 611 are configured to have the same thickness as a thickness of the rotating side ring plate 11. Although the connecting portions 611 have the same thickness as the thickness of the rotating side ring plate 11 in this embodiment, the thickness is not limited thereto but can be changed as appropriate.

The inner protrusions 612 are convex bodies protruding from the connecting portions 611 toward the outer side in the longitudinal direction X by the same length as a plate width of the connecting portions 611 in plan view. The two inner protrusions 612 protrude from the connecting portions 611, and are disposed at positions spaced apart by a predetermined distance from the longitudinal window frames 41 formed on the inner side in transverse direction Y and the outer side in the transverse direction Y, respectively. That is, the two inner protrusions 612 protrude at equal intervals toward the outer side in the longitudinal direction X so as to be line-symmetric with respect to a center line in the longitudinal X of the connecting portions 611 in plan view.

As shown in FIGS. 3, 4(*a*), and 4(*b*), the outer holding portion 62 is configured by a longitudinal frame 621 formed along the longitudinal direction X at both ends of the viewing window 40 in the transverse direction Y, a transverse frame 622 formed along the transverse direction Y at both ends of the viewing window 40 in the longitudinal direction X, outer regulating portions 623 protruding from a center of the transverse frame 622 toward the inner side in the longitudinal direction X, and three regulating protrusions 624 arranged at equal intervals from an inner end of the outer regulating portions 623 in the longitudinal direction X.

The outer regulating portions 623 have a first outer regulating portion 623*x* and a second outer regulating portion 623*y* that are disposed to face each other with respect to the viewing window 40. The first shortest distance L1 between the first outer regulating portion 623*x* and the second outer regulating portion 623*y* is configured to be shorter than a length L3 of the cover member 50 that faces the first shortest distance L1 when the cover member 50 is disposed at the viewing window 40.

As shown in FIGS. 4(*a*) and 4(*b*), the longitudinal frame 621 and the transverse frame 622 are frame bodies erected upward from the top surface of the rotating side ring plate 11 so as to have the same height as the thickness of the rotating side ring plate 11, and are provided so as to surround the viewing window 40 in plan view.

Specifically, the longitudinal frame 621 is disposed at both ends in the transverse direction Y with respect to the longitudinal window frames 41 (see FIG. 4(*a*)), and the transverse frame 622 is disposed at a position such that an end on the longitudinal direction X is flush with the transverse window frames 42 (see FIG. 4(*b*)). Thus, the rotating side ring plate 11 can be seen on the inner side in the transverse direction Y of the longitudinal frame 621 in plan view.

Note that the height of the longitudinal frame 621 and the transverse frame 622 is the same as the thickness of the rotating side ring plate 11, but is not limited thereto, and can be adjusted as appropriate.

As shown in FIG. 4(*b*), each outer regulating portion 623 is a plate-like body protruding from the central portion of the transverse frame 622 toward the inner side in the longitudinal direction X such that top surfaces of the outer regulating portions 623 is flush with the transverse frame 622. The thickness of the outer regulating portions 623 is configured to be a length determined by subtracting the thickness of the cover member 50 from the height of the transverse frame 622.

Further, the length of the outer regulating portions 623 along the transverse direction Y is configured to be substantially the same as the corresponding length of the viewing window 40.

Note that the thickness and the length in the transverse direction of the outer regulating portions 623 are not limited to the above-described thickness and can be adjusted as appropriate.

The regulating protrusions 624 are convex portions protruding toward the inner side in the longitudinal direction X from three places of both ends of the outer regulating portions 623 in the transverse direction Y and a central portion in the transverse direction Y, and are disposed along the transverse direction Y at predetermined intervals. Further, an outer guide 625 configured by a tapered surface that tapers toward the outer side in the longitudinal direction X is provided on a bottom surface of each of the regulating protrusions 624 on the inner side in the longitudinal direction X.

The three regulating protrusions 624 configured as described above are disposed to mesh with the two inner protrusions 612 protruding from the connecting portions 611 disposed to face the outer regulating portions 623 in plan view (see FIG. 4(*a*)). Further, tips of the regulating protrusions 624 are disposed on the inner side in the longitudinal direction X with respect to tips of the inner protrusions 612.

A holding space T that allows the cover member 50 to be inserted and held is formed between the inner regulating portions 61 and the outer regulating portions 623 configured as described above (see FIG. 4(*b*)).

In this embodiment, the thickness of the cover member 50 is configured to be the same as a height difference between the bottom surfaces of the outer regulating portions 623 and the top surface of the rotating side ring plate 11. However, the thickness of the cover member 50 is not necessarily required to be this thickness. Alternatively, the thickness of the cover member 50 may be smaller than the difference in height between the bottom surfaces of the outer regulating portions 623 and the rotating side ring plate 11.

Next, the assembling method of assembling the cover member 50 to the viewing window 40 while holding the cover member 50 against the cover member holding portion 60 configured as described above will be briefly described on the basis of FIGS. 5(*a*) to 5(*c*).

First, as shown in FIG. 5 (*a*), the cover member 50 is deflected by applying an external force so as to be convex upward when viewed from the transverse direction Y. The cover member 50 is disposed such that both ends of the cover member 50 in the longitudinal direction X can be inserted into the holding space T. Since the length of the cover member 50 in the longitudinal direction X is sufficiently longer than the distance between the connecting portions 611, both end sides in the longitudinal direction X of the cover member 50 can be disposed at the position of the holding space T while the cover member 50 is bent.

By releasing the external force applied to the cover member 50 in this state, a restoring force F for the cover member 50 to return to the original plate-like body is applied, and consequently, the cover member 50 is inserted into the holding space T (see FIG. 5(*b*)). At this time, the inner guide 613 and the outer guide 625 guide the end sides of the cover member 50 into the holding space T.

Further, the cover member 50, which is restored to a plate-like body by the restoring force F of the cover member 50, is thereby held in the holding space T formed by the inner regulating portions 61, the outer regulating portions 623, and the regulating protrusions 624 (see FIG. 5(*c*)). In this state, the inner regulating portions 61 can regulate a downward movement of the cover member 50. Similarly, the outer regulating portions 623 and the regulating protrusions 624 can regulate an upward movement of the cover member 50.

In addition, since both ends of the cover member 50 in the transverse direction Y are held by the rotating side ring plate 11, the cover member 50 can be held in the holding space T more reliably. This allows the cover member 50 to be reliably assembled to the viewing window 40.

An end face of the cover member 50 on the outer side in the longitudinal direction X and the transverse window frames 42 are not in contact with each other. However, the end face may be in contact with transverse window frames 42 as long as both ends of the cover member 50 are disposed below the outer regulating portions 623 disposed opposite to each other.

In this embodiment, as described above, the ends of the cover member 50 deflected by applying an external force so as to be convex upward are disposed at a position where the cover member 50 can be inserted into the holding space T. The cover member 50 can be assembled to the viewing window 40 while being held by the cover member holding portion 60 only by releasing the applying external force.

In the rotary connector device body 2 configured as described above, the rotator 10 the stator 20 are assembled so as to be relatively rotatable in both the clockwise direction and the counterclockwise direction, the rotator 10 being configured by the annular rotating side ring plate 11 and the cylindrical inner peripheral cylinder portion 12 formed on the inner peripheral edge of the rotating side ring plate 11, the stator 20 being configured by the annular fixed side ring plate 21 and the cylindrical outer peripheral cylinder portion 22 formed on the outer peripheral edge of the fixed side ring plate 21. The rotary connector device body 2 has the housing space S that can house the FFC 100 therein, and includes the viewing window 40 through which the housing space S can be viewed from outside of the device and that communicates between the housing space S and outside of the device, the transparent and flexible cover member 50 disposed so as to close the viewing window 40, the outer regulating portions 623 and the regulating protrusions 624 that regulate the movement of the cover member 50 toward outside of the device (upward), and the inner regulating portions 61 that regulate the movement of the cover member 50 toward the housing space S (downward). In the rotary connector device body 2, the outer regulating portions 623, the regulating protrusions 624, and the inner regulating portions 61 are disposed to face each other with respect to the viewing window 40, the cover member 50 is held in the holding space T formed between the outer regulating portions 623, the regulating protrusions 624, and the inner regulating portions 61, and the length of the cover member 50 in the longitudinal direction X is configured to be longer than the distance between the inner regulating portions 61 disposed to face each other, thereby preventing a reduction in the visibility of the viewing window 40.

Specifically, as shown in FIGS. 5(*a*) to 5(*c*), the end sides of the cover member 50 deflected by applying an external force so as to be convex upward are disposed at a position where the cover member 50 can be inserted into the holding space T. By releasing the applied external force, the cover member 50 is inserted into the holding space T by its own restoring force F, and slides between the inner regulating portions 61, the outer regulating portions 623, and the regulating protrusions 624. The cover member 50 is thereby held in the holding space T.

In addition, the inner regulating portions 61, the outer regulating portions 623, and the regulating protrusions 624 are provided, and the length of the cover member 50 in the longitudinal direction X is configured to be longer than the distance between the inner regulating portions 61 disposed to face each other. The cover member 50 can be therefore inserted into the holding space T while being bent, and the inner regulating portions 61, the outer regulating portions 623, and the regulating protrusions 624 can regulate the upward and downward movement of the cover member 50 held in the holding space T while keeping its original plate-like body.

As described above, in the rotary connector device body 2, the cover member 50 can be easily disposed at the viewing window 40 and reliably held against the viewing window 40 only by deflecting the cover member 50 and inserting the deflected cover member 50 into the holding space T. Thus, there is no need to use an adhesive layer or the like. Therefore, no foreign matter or dust adheres to an adhesive layer, and a decrease in the visibility of the viewing window 40 can be prevented.

Furthermore, since the cover member 50 can be held only by being inserted into the holding space T, for example, there is no need to apply an adhesive layer to the cover member 50. This can prevent an adhesive attached to the viewing window 40 from becoming cloudy due to deterioration over time and blocking the view.

Further, since the cover member 50 is reliably held against the viewing window 40 as described above, the housing space S can be visually confirmed through the viewing window 40, and a state of the FFC 100 housed in the housing space S can be confirmed. That is, a mark provided on the FFC 100 can be visually recognized, and it can be confirmed whether the rotary connector device 1 housing the FFC 100 in the rotary connector device body 2 is fixed at a neutral position. Further, the cover member 50 is disposed so as to close the viewing window 40, and this can prevent foreign matter from entering the housing space S.

Further, the inner regulating portions 61, the outer regulating portions 623, and the regulating protrusions 624 are disposed to face each other with respect to the viewing window 40. Thus, both end sides of the cover member 50 can be inserted into the holding space T. The connecting portions 611, the outer regulating portions 623, and the regulating protrusions 624 disposed to face each other can regulate the upward and downward movement of the cover member 50 at both ends of the cover member 50 in the longitudinal direction X. The cover member 50 can be held in the holding space T more stably.

In addition, the inner regulating portions 61, the outer regulating portions 623, and the regulating protrusions 624 include the inner guide 613 and the outer guide 625 that guide the cover member 50 to the holding space T. Thus, the cover member 50 can be guided in the holding space T, and disposed at the viewing window 40 more easily.

Furthermore, the viewing window 40 is provided on the rotating side ring plate 11, the FFC 100 housed in the housing space S can be confirmed even when the rotary connector device 1 in which the FFC 100 is assembled to the rotary connector device body 2 is assembled to a combination switch or the like. That is, it can be confirmed that the rotator 10 assembled to the combination switch or the like is at the neutral position with respect to the stator 20. Therefore, the steering wheel can be securely attached to the rotary connector device 1.

Furthermore, the cover member 50 assembled to the viewing window 40 is pulled toward outside of the device by applying an external force to the cover member 50 and deflecting the cover member 50 upward. The end sides of the cover member 50 can be thus removed from between the inner regulating portions 61, the outer regulating portions 623, and the regulating protrusions 624. Thus, the cover member 50 can be removed from the viewing window 40. In this way, the cover member 50 can be easily exchanged by deflecting the cover member 50 to be convex upward and pulling the deflected cover member 50 toward outside of the device.

Further, unlike the first embodiment, the outer holding portion 62 does not need to be erected from the rotating side ring plate 11 toward outside of the device (upward), and the outer holding portion 62 may be erected from the rotating side ring plate 11 toward the housing space S.

Second Embodiment

Next, a rotary connector device 1b (rotary connector device body 2b) including a cover member holding portion 70 according to another embodiment of the cover member holding portion 60 will be described on the basis of FIGS. 6 to 10.

A configuration of the rotary connector device 1b (rotary connector device body 2b) to be described below that is similar to a configuration of the rotary connector device 1 or the rotary connector device body 2 described above is denoted by the same reference sign, and a description thereof is omitted.

Figure 6:
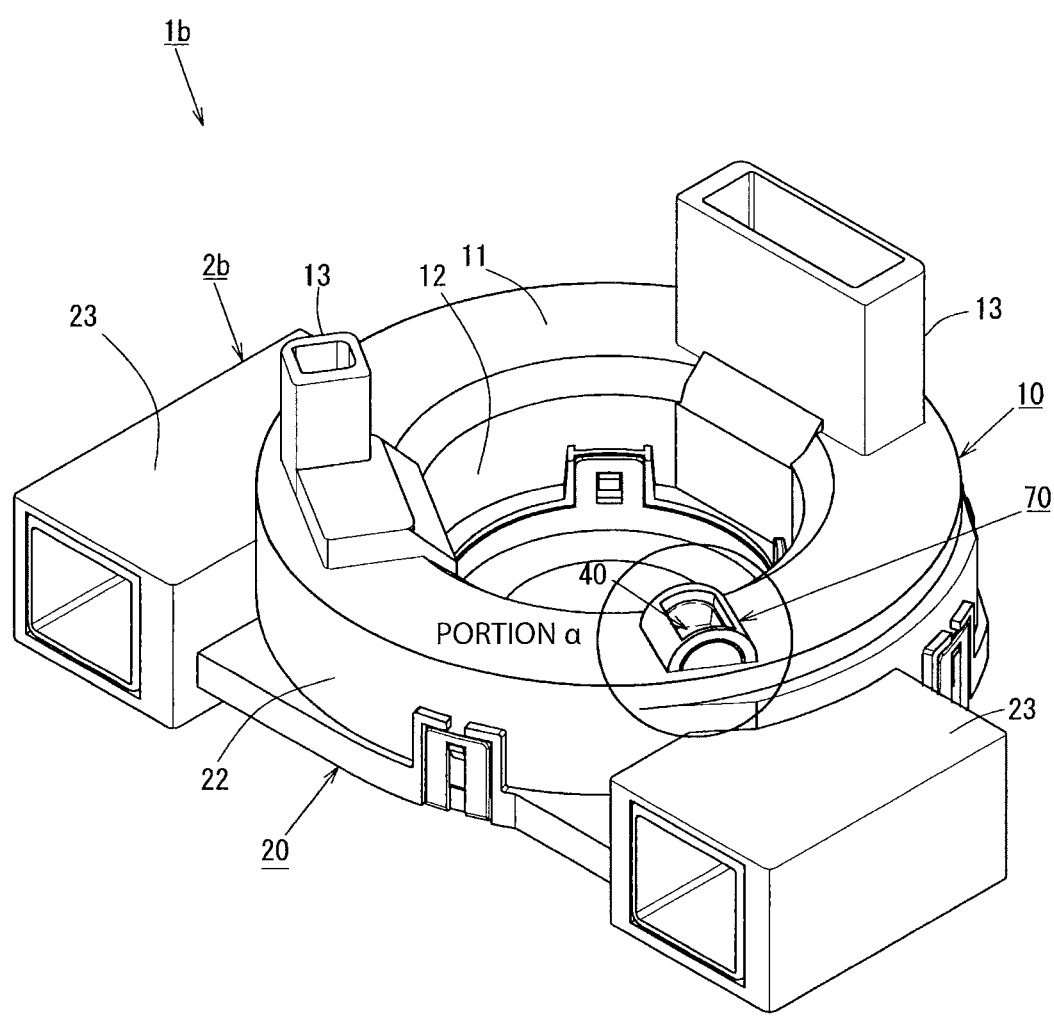
FIG. 6 is a schematic perspective view of a rotary connector device according to a second embodiment.
Figure 7:
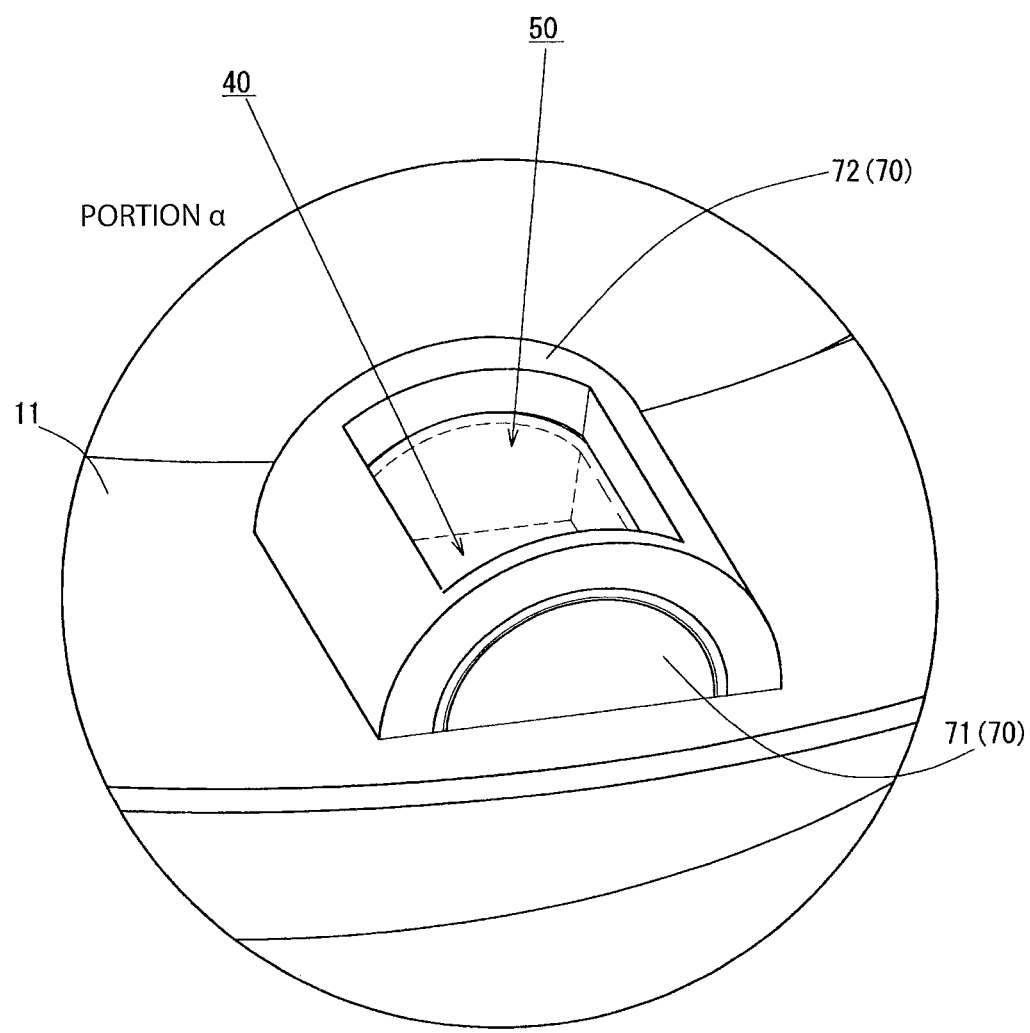
FIG. 7 is an enlarged schematic perspective view of a portion α in the second embodiment.
Figure 8A:
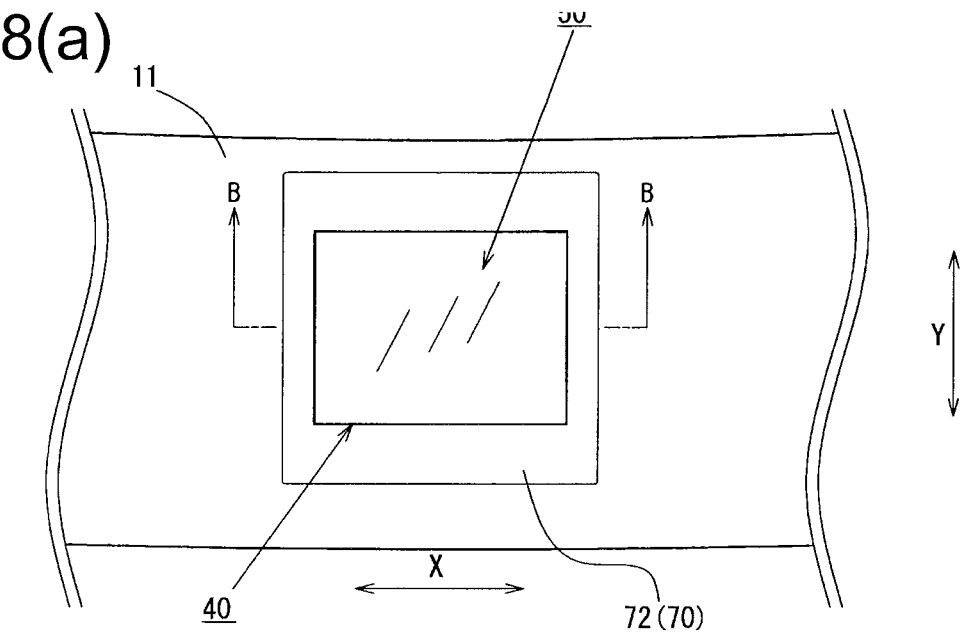
FIGS. 8(a) to 8(c) are explanatory diagrams of a cover member holding portion in the second embodiment.
Figure 8B:
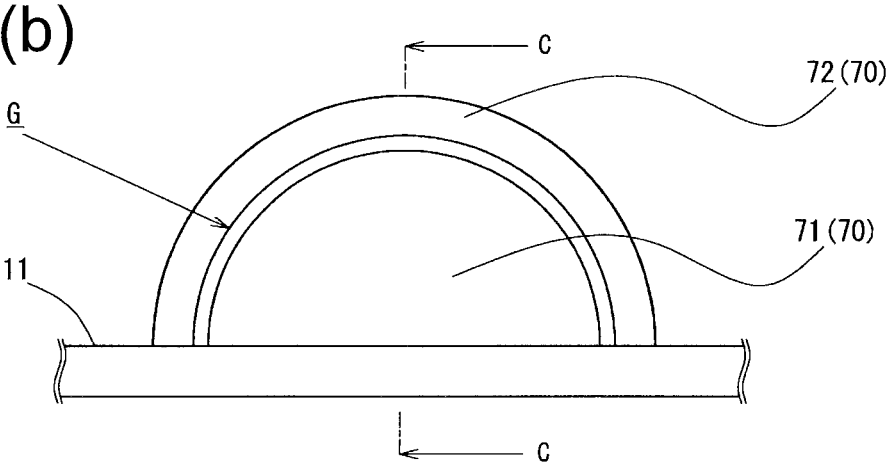
Figure 8C:
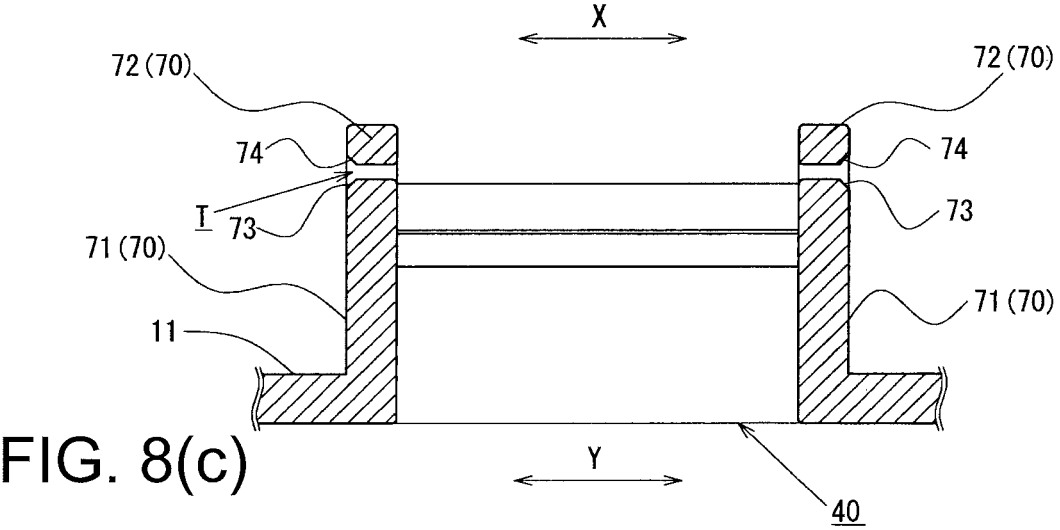
Figure 9A:
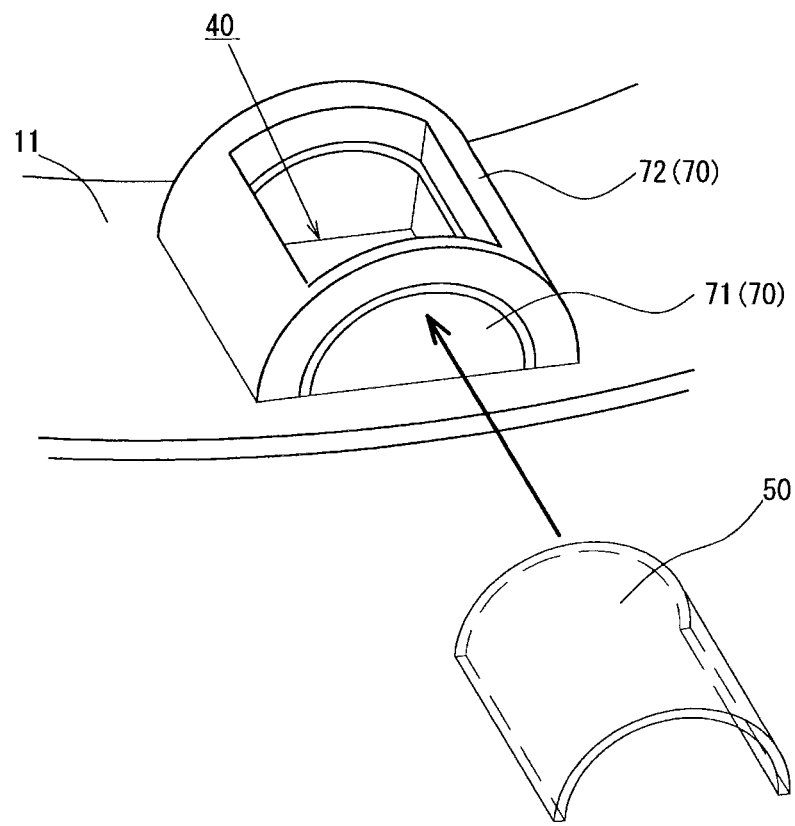
FIGS. 9(a) and 9(b) are explanatory diagrams of an assembling method of assembling a cover member to a viewing window in the second embodiment.
Figure 9B:
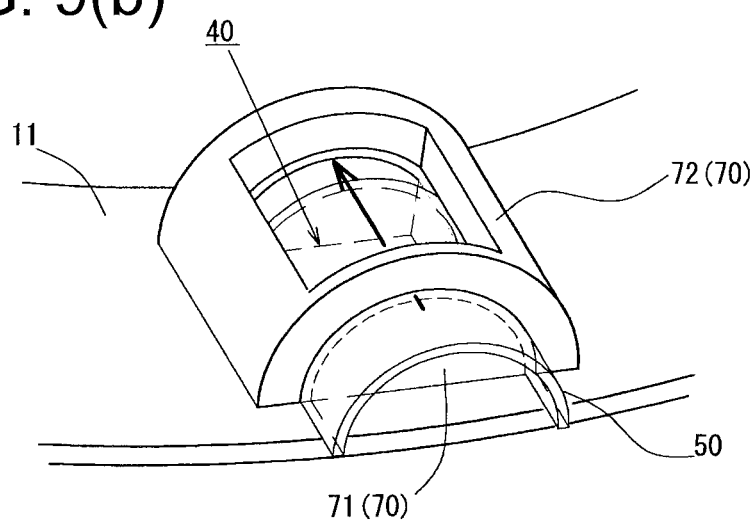
Figure 10:
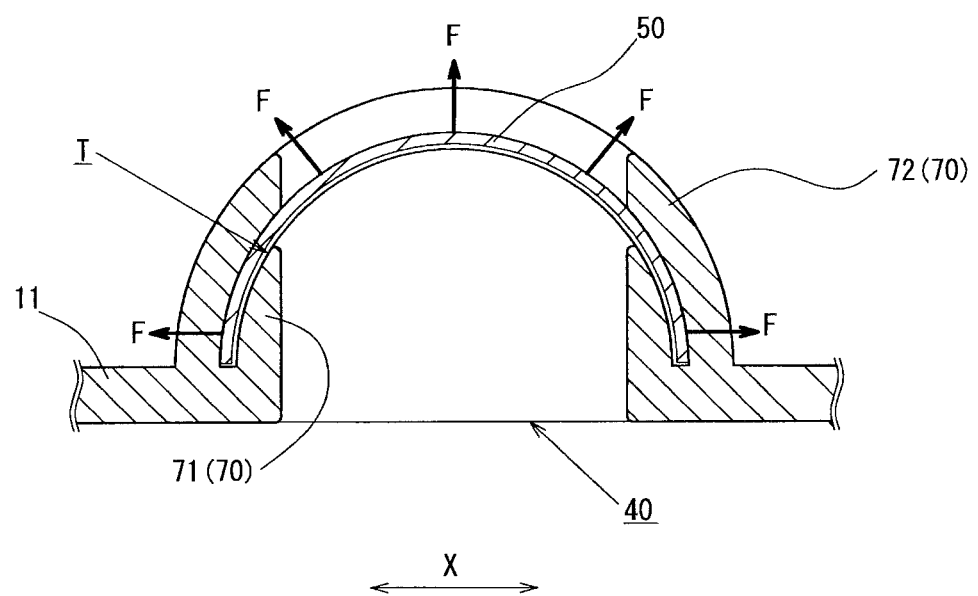
FIG. 10 is an explanatory diagram of the cover member being assembled to the viewing window in the second embodiment.

FIG. 6 is a schematic perspective view of the rotary connector device 1b. FIG. 7 is an enlarged view of the portion α of FIG. 6 in the rotary connector device body 2b. FIGS. 8(a) to 8(c) are explanatory diagrams showing a configuration of the cover member holding portion 70. FIGS. 9(a) and 9(b) are explanatory views of an assembling method of assembling the cover member 50 to the cover member holding portion 70. FIG. 10 is a cross-sectional view taken along the line B-B in FIG. 8(a).

Specifically, FIG. 8(a) is a plan view of the cover member holding portion 70 to which the cover member 50 is assembled. FIG. 8(b) is a side view of the cover member holding portion 70 as viewed from the transverse direction Y. FIG. 8(c) is a cross-sectional view taken along the line C-C in FIG. 8(b). FIG. 9(a) is a schematic perspective view showing a state before the cover member 50 is assembled to the cover member holding portion 70. FIG. 9(b) is a schematic perspective view showing the cover member 50 is being assembled to the cover member holding portion 70.

In FIGS. 9(a) and 9(b), configurations other than the rotating side ring plate 11, the viewing window 40, the cover member 50, and the cover member holding portion 70 are omitted.

As shown in FIGS. 7 and 8(a), the rotating side ring plate 11 of the rotary connector device body 2b is provided with the viewing window 40, and the cover member holding portion 70 that holds the cover member 50 against the viewing window 40.

As shown in FIGS. 7 and 8(a), the cover member holding portion 70 is formed at a location corresponding to the viewing window 40, and is a substantially cylindrical body having a semicircular bottom surface provided with a through hole vertically penetrating at a location corresponding to the viewing window 40. The cover member holding portion 70 is configured by arc-shaped inner regulating portions 71 and an arc-shaped outer regulating portion 72 that is a cylindrical body covering the outer periphery of the arc-shaped inner regulating portions 71.

As shown in FIGS. 8(b) and 8(c), each of the arc-shaped inner regulating portions 71 is a cylindrical body that has a semicircular bottom surface being convex upward and having a longer diameter than a length of the viewing window 40 in the longitudinal direction X and that has a height extending along the transverse direction Y. Each of the arc-shaped inner regulating portions 71 is provided with a through hole vertically penetrating at a location corresponding to the viewing window 40. Further, an inner arc guide 73 configured by a tapered surface tapering toward the viewing window 40 is provided on a top surface of each arc-shaped inner regulating portion 71 on both ends in the transverse direction Y.

The arc-shaped outer regulating portion 72 is a cylindrical body that has a semi-annular bottom surface whose inner periphery has a diameter larger by the thickness of the cover member 50 than the diameter of the arc-shaped inner regulating portions 71, and that has a height extending along the transverse direction Y The arc-shaped outer regulating portion 72 is provided with a through hole vertically penetrating in a portion corresponding to the viewing window 40 in plan view. Further, an outer arc guide 74 configured by a tapered surface tapering toward the viewing window 40 is provided on a lower surface of the arc-shaped outer regulating portion 72 on both ends in the transverse direction Y.

Note that the length of the arc-shaped inner regulating portions 71 and the arc-shaped outer regulating portion 72 in the transverse direction Y is longer than the corresponding length of the viewing window 40 in the transverse direction Y.

As shown in FIGS. 8(*b*) and 8(*c*), in the cover member holding portion 70 formed as described above, a holding space T having the same distance as the plate thickness of the cover member 50 is formed between the arc-shaped outer regulating portion 72 and the arc-shaped inner regulating portions 71 in the transverse direction Y. An arc-shaped insertion hole G through which the cover member 50 can be inserted is formed on both ends in the transverse direction Y of each arc-shaped inner regulating portion 71 and the arc-shaped outer regulating portion 72. Thus, the cover member 50 can be inserted into the arc-shaped insertion hole G and held by the cover member holding portion 70.

Specifically, the cover member 50, which is deflected upward by applying an external force to be in a semicircular tubular shape convex, is inserted through the insertion hole G from the outer side in the transverse direction Y to the inner side in the transverse direction Y (see FIG. 9(*a*)). The cover member 50 can be held in the holding space T by being pushed in the transverse direction Y (see FIG. 9(*b*)), and the cover member 50 can be assembled to the cover member holding portion 70.

The cover member 50 incorporated in the cover member holding portion 70 as described above is released from the external force deflecting the cover member 50 into a tubular shape. Thus, the restoring force F to return the cover member 50 to the original plate-like body is applied to the cover member 50. However, the cover member 50 is pressed against an inner peripheral surface of the arc-shaped outer regulating portion 72 by the restoring force F. A frictional force is thus generated between the cover member 50 and the inner peripheral surface of the arc-shaped outer regulating portion 72. The cover member 50 is therefore fixed by the cover member holding portion 70 (see FIG. 10).

In other words, the restoring force F applied to the cover member 50 locks the cover member 50 to the cover member holding portion 70. The cover member 50 thereby reliably closes the viewing window 40 and is held against the viewing window 40.

In the rotary connector device 1*b* configured as described above, the rotator 10 and the stator 20 are assembled so as to be relatively rotatable in both the clockwise direction and the counterclockwise direction, the rotator 10 being configured by the annular rotating side ring plate 11 and the cylindrical inner peripheral cylinder portion 12 formed on the inner peripheral edge of the rotating side ring plate 11, the stator 20 being configured by the annular fixed side ring plate 21 and the cylindrical outer peripheral cylinder portion 22 formed on the outer peripheral edge of the fixed side ring plate 21. The rotary connector device 1*b* has the housing space S that can house the FFC 100 therein, and includes the viewing window 40 through which the housing space S can be viewed from outside of the device and that communicates between the housing space S and outside of the device, the transparent and flexible cover member 50 disposed so as to close the viewing window 40, the arc-shaped outer regulating portion 72 that regulates the movement of the cover member 50 toward outside of the device, and the arc-shaped inner regulating portions 71 that regulate the movement of the cover member 50 toward the housing space S. In the rotary connector device 1*b*, the arc-shaped inner regulating portions 71 and the arc-shaped outer regulating portion 72 are disposed to face each other with respect to the viewing window 40, the cover member 50 is held in the holding space T formed between the arc-shaped inner regulating portions 71 and the arc-shaped outer regulating portion 72, and the length of the cover member 50 in the longitudinal direction X is configured to be longer than the distance between the arc-shaped inner regulating portions 71 disposed to face each other. Therefore, the rotary connector device 1*b* has a similar effect as the rotary connector device 1 according to the first embodiment.

In addition, the arc-shaped outer regulating portion 72 is configured to hold the cover member 50 in an arc shape protruding upward. This generates a restoring force F applied toward a radial outer side of the arc shape of the flexible cover member 50, that is, from a bottom surface toward a top surface of the cover member 50. On the other hand, since the arc-shaped outer regulating portion 72 is configured to hold the shape of the cover member 50 in an arc shape, the external force that holds the arc shape is applied to the cover member 50 spreading upward due to the restoring force F in a direction opposite to a direction in which the restoring force F is applied. Therefore, the frictional force is generated between the cover member 50 and the arc-shaped outer regulating portion 72.

Thus, the cover member 50 is fixed to the viewing window 40 while maintaining its shape by the arc-shaped outer regulating portion 72. This can prevent the cover member 50 from coming off from the viewing window 40 and prevent foreign matter from entering the inside of the housing space S even when an unexpected external force is applied to the cover member 50.

Further, the cover member 50, which is formed in a circular arc that is convex upward, has the restoring force F applied from the bottom surface toward the top surface of the cover member 50. Therefore, the cover member 50 can be suppressed from entering the housing space S side even when a downward external force is applied to the cover member 50.

When an external force is applied to the cover member 50 from the housing space S side, the arc-shaped outer regulating portion 72 regulates the movement of the cover member 50 toward outside of the device, and thus the cover member 50 can be prevented from easily coming off. Even if the cover member 50 comes off, the cover member 50 comes off upward. This can suppress the cover member 50 from entering the housing space S side.

Further, the inner arc guide 73 and the outer arc guide 74 are formed in the arc-shaped inner regulating portions 71 and the arc-shaped outer regulating portion 72, respectively. Thus, the cover member 50 can be easily guided to the insertion hole G, and the cover member 50 can be easily disposed at the viewing window 40.

Furthermore, the arc-shaped outer regulating portion 72, which is locked by utilizing the restoring force F of the cover member 50, can reliably lock the cover member 50 to the cover member holding portion 70. Thus, the cover member 50 can be stably held against the viewing window 40 and fixed to the viewing window 40. This can prevent the cover member 50 from coming off.

In addition, the arc-shaped outer regulating portion 72 is provided in the direction in which the restoring force F is applied at the position of the cover member 50 to be locked. The cover member 50 can be thus locked by utilizing the restoring force F of the flexible cover member 50. Therefore, the cover member 50 can be locked with a simple configuration.

In correspondence between the configuration of the present invention and the above embodiments, the rotating body corresponds to the rotator 10,
the fixed body corresponds to the stator 20,
the rotary connector corresponds to the rotary connector device bodies 2 and 2b,
the inner regulating portion corresponds to the inner regulating portions 61 and the arc-shaped inner regulating portions 71,
the outer regulating portion corresponds to the outer regulating portions 623, the regulating protrusions 624, and the arc-shaped outer regulating portion 72,
the shape holding portion corresponds to the arc-shaped outer regulating portion 72,
the guide corresponds to the inner guide 613, the outer guide 625, the inner arc guide 73, and the outer arc guide 74.

However, the present invention is not limited to only the configuration of the above embodiments but can obtain multiple embodiments.

For example, the viewing window 40 is provided on the rotating side ring plate 11, but the arrangement position of the viewing window 40 is not limited as long as the housing space S can be visually confirmed from outside of the device. The viewing window 40 may be disposed, for example, on the fixed side ring plate 21, the inner peripheral cylinder portion 12, the outer peripheral cylinder portion 22, or at a corner formed by the rotating side ring plate 11 and the inner peripheral cylinder portion 12. The shape of the viewing window 40 is not particularly limited, but may be varied as a rectangle, a polygon, a circle, an ellipse, a fan, or the like.

Furthermore, the inner regulating portions 61 and the arc-shaped inner regulating portion 71 are provided along the transverse direction Y in the first and second embodiments, but may be provided along the longitudinal direction X, and may be provided in a direction intersecting with the longitudinal direction X.

In the first and second embodiments, a pair of inner regulating portions 61 and outer regulating portions 623, the arc-shaped inner regulating portion 71 and the arc-shaped outer regulating portion 72, and the like are disposed to face each other with respect to the viewing window 40. However, for example, in the first embodiment, as in the case of providing substantially U-shaped inner regulating portions 61 along the outer side in the longitudinal direction X and the inner side in the transverse direction Y of the viewing window 40, the number of the inner regulating portions 61 may be one, and the number of the outer regulating portions 623 may be one.

Further, in the first embodiment, the cover member 50 is formed in a flat plate shape and disposed with respect to the viewing window 40. However, as shown in FIGS. 11(a) to 12(b), the cover member 50 may be formed in an arc shape.

Figure 11A:
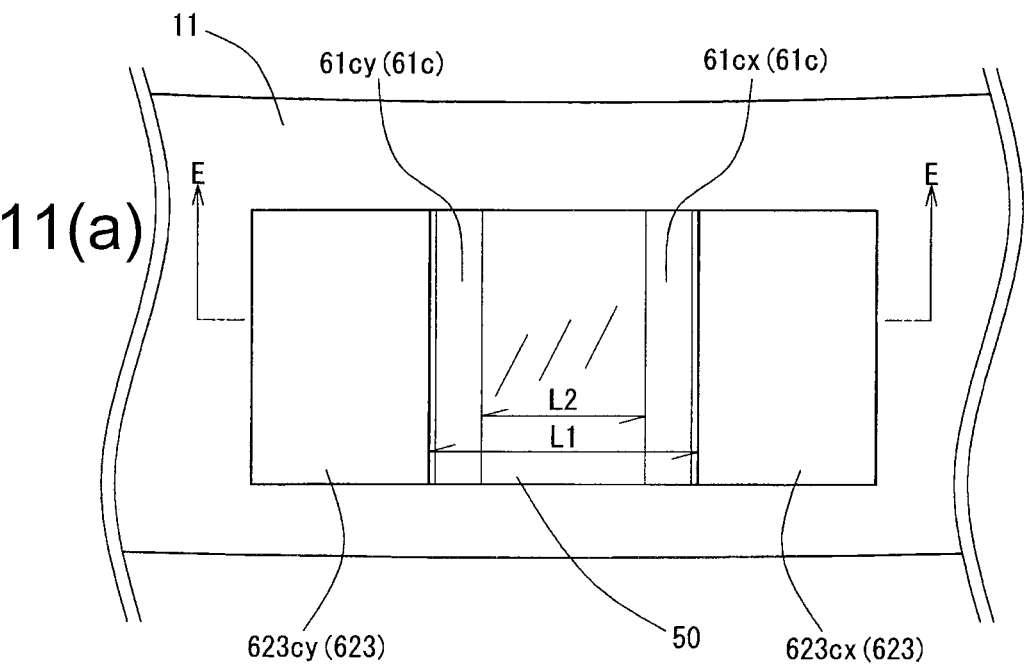
FIGS. 11(a) to 11(c) are explanatory diagrams of a cover member holding portion in another embodiment.
Figure 11B:
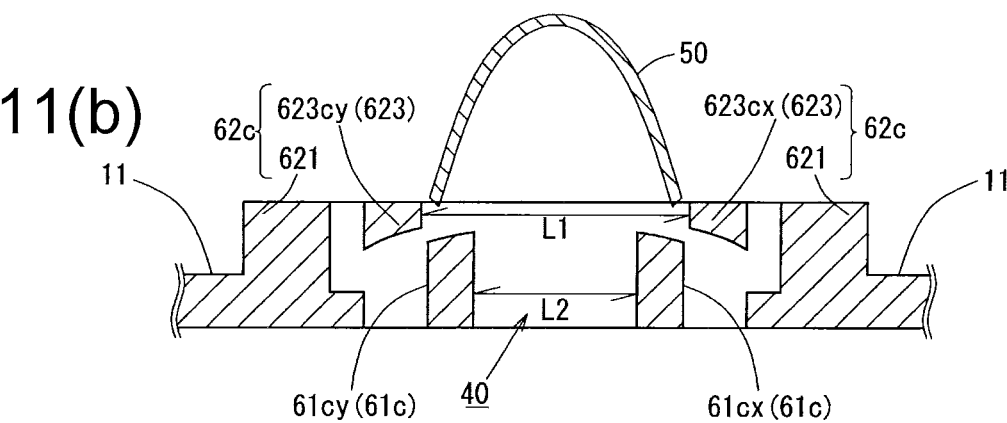
Figure 11C:
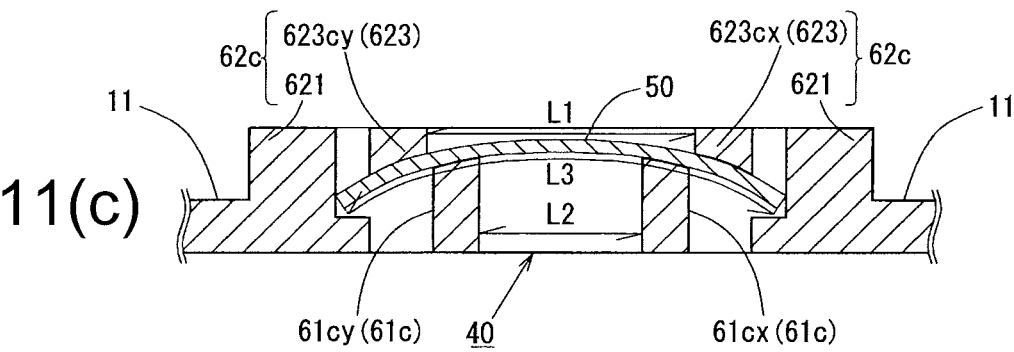
Figure 12A:
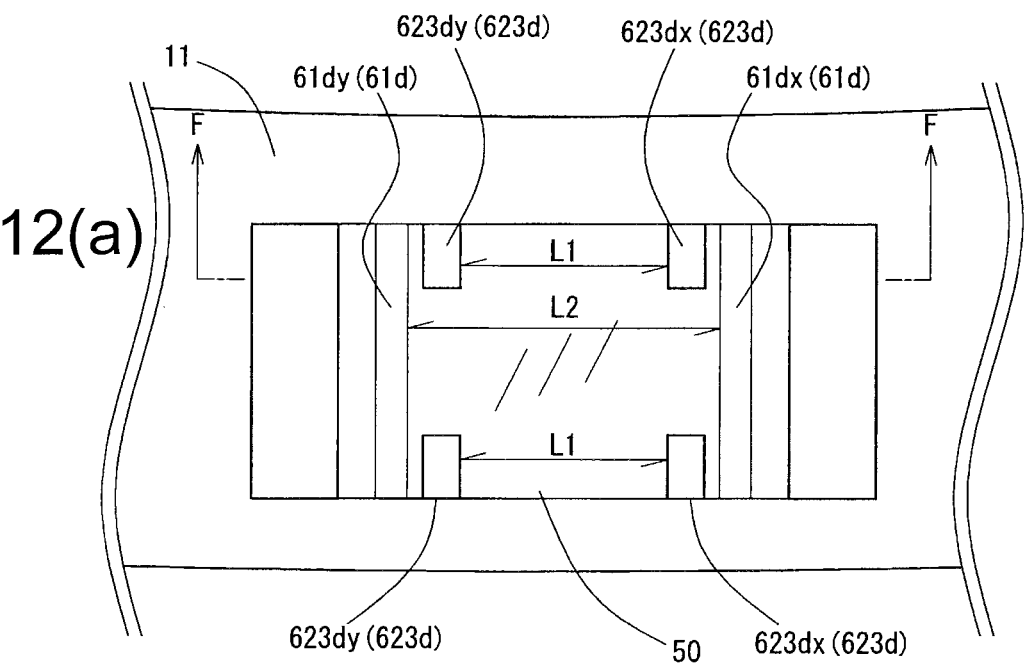
FIGS. 12(a) and 12(b) are explanatory diagrams of a cover member holding portion in still another embodiment.
Figure 12B:
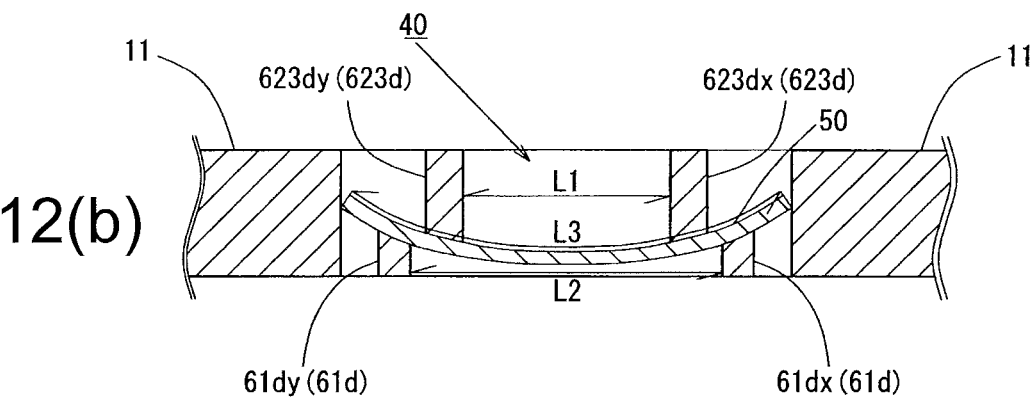

Here, FIGS. 11(a) to 12(b) illustrate a cover member holding portion 60c and a cover member holding portion 60d, respectively, according to embodiments other than the first embodiment. FIG. 11(a) is a plan view of the viewing window 40 according to another embodiment, FIG. 11(b) is a cross-sectional view taken along the line E-E in FIG. 11(a) before the cover member 50 is held in the holding space T. FIG. 11(c) is a cross-sectional view taken along the line E-E while the cover member 50 is held. FIG. 12(a) is a plan view of the viewing window 40 in an embodiment different from FIGS. 11(a) to 11(c). FIG. 12(b) is a cross-sectional view taken along the line F-F in FIG. 12(a) while the cover member 50 is held.

For example, in the embodiment shown in FIGS. 11(a) to (c), a top surface of an inner regulating portion 61c corresponding to the inner regulating portions 61 is formed in an arc shape having a predetermined curvature. A bottom surface of an outer regulating portion 623c corresponding to the outer regulating portions 623 is formed in an arc shape having a predetermined curvature. The outer regulating portion 623c and the inner regulating portion 61e are disposed in that order from the outer side in the longitudinal direction X to the inner side in the longitudinal direction X (see FIGS. 11(a) and 11(b)).

Further, a protrusion 67c protruding toward the inner side in the longitudinal direction X is provided on a lower end of each longitudinal window frame 41.

As shown in FIG. 11(b), the cover member holding portion 60c configured as described above can hold the cover member 50 in the holding space T by inserting, into the holding space T, the cover member 50 deflected by applying an external force to be convex upward and then releasing the external force.

At this time, the top surface of the cover member 50 contacts the outer regulating portion 623c, and the bottom surface of the cover member 50 contacts the inner regulating portion 61c. Further, both end sides of the cover member 50 on the outer side in the longitudinal direction X are locked by transverse window frames 42c functioning as locking portions. The cover member 50 is therefore held in the holding space T while kept in an arc shape that is convex upward (see FIG. 10(c)).

The curvatures of the inner regulating portion 61c and the outer regulating portion 623e may be the same curvature. However, when the curvature of the inner regulating portion 61c is larger than the curvature of the outer regulating portion 623c, the inner regulating portion 61c and the outer regulating portion 623c can grip the cover member 50 to reliably fix the cover member 50.

As shown in FIGS. 12(a) and 12(b), in the cover member holding portion 60d, a top surface of an inner regulating portion 61d corresponding to the inner regulating portions 61 is formed in an arc shape having a predetermined curvature. A bottom surface of an outer regulating portion 623d corresponding to the outer regulating portions 623 is formed in an arc shape having a predetermined curvature. The outer regulating portion 623d and the inner regulating portion 61d are disposed in that order from the outer side in the longitudinal direction X to the inner side in the longitudinal direction X.

Note that the outer regulating portion 623d protrudes from the transverse window frames 42 toward the viewing window 40, but does not connect the transverse window frames 42 to each other (see FIG. 12(a)).

As shown in FIG. 12(b), in the cover member holding portion 60d configured as described above, the cover member 50 disposed through the holding space T is formed in an arc shape protruding downward. Thus, the top surface of the cover member 50 contacts the outer regulating portion 623d and the bottom surface of the cover member 50 contacts the inner regulating portion 61d due to the restoring force of the cover member 50. Further, both end sides of the cover member 50 on the outer side in the longitudinal direction X are locked by the transverse window frames 42 functioning as locking portions, and thus the cover member 50 is held in the holding space T.

The curvatures of the inner regulating portion 61d and the outer regulating portion 623d may be the same curvature. However, when the curvature of the outer regulating portion 623d is larger than the curvature of the inner regulating portion 61d, the inner regulating portion 61d and the outer regulating portion 623c can grip the cover member 50 to reliably fix the cover member 50.

Further, the configurations described above can be combined with each other as long as the effect of the present embodiment that the cover member 50 can be easily assembled to the viewing window 40 can be obtained.

An arrangement position of the viewing window is not limited as long as the housing space can be visually confirmed from outside of the device. The viewing window may be disposed, for example, on the rotating side ring plate, the fixed side ring plate, the inner peripheral cylinder portion, the outer peripheral cylinder portion, or at a corner formed by the rotating side ring plate and the inner peripheral cylinder portion.

A shape of the viewing window is not particularly limited, but includes various shapes such as a rectangle, a polygon, a circle, and an ellipse.

The cover member only needs to have a configuration in which the neutral position of the FFC can be confirmed from the viewing window, including a configuration that covers the viewing window, and a configuration that is fitted into and closes the viewing window.

The outer regulating portion and the inner regulating portion include a configuration to regulate a movement of the cover member by contacting the outer regulating portion and the inner regulating portion, a configuration to regulate the movement of the cover member by interposing the cover member between the outer regulating portion and the inner regulating portion, and a configuration to regulate the movement of the cover member by arranging the outer regulating portion and the inner regulating portion apart from the cover member and interfering with the cover member moved by, for example, vibration or the like.

Further, the above description that at least one of the outer regulating portion or the inner regulating portion is disposed to face each other means, for example, that two independent outer regulating portions or two independent inner regulating portions face each other, or that one outer regulating portion or one inner regulating portion is provided along a circumferential direction of the viewing window and parts of the outer regulating portion or the inner regulating portion are disposed to face each other. That is, the number of the outer regulating portion or the inner regulating portion is not necessarily limited to plural.

The present embodiment can prevent a reduction in visibility of the viewing window.

Specifically, the cover member is inserted into the holding space while being deflected, and the cover member can be therefore disposed at a predetermined position with respect to the viewing window. Then, the cover member comes into contact with the outer regulating portion or the like forming the holding space by a restoring force of the cover member generated by releasing an external force applied to the cover member, and thus the cover member can be held in the holding space.

In addition, the cover member includes the outer regulating portion and the inner regulating portion, and a corresponding dimension of the cover member is configured to be longer than a distance between at least one of the outer regulating portion or the inner regulating portion disposed to face each other. Thus, the movement of the cover member held in the holding space toward outside of the device and toward the housing space can be regulated. The cover member can be therefore reliably assembled to the viewing window.

In this way, the cover member can be disposed at the viewing window and securely held at the viewing window only by inserting the deflected cover member into the holding space. Thus, there is no need to apply an adhesive layer to the cover member before attaching the cover member to the viewing window. This can prevent a reduction in the visibility of the viewing window due to foreign matter and dust adhering to the adhesive layer. Further, since the cover member can be disposed at the viewing window only by deflecting the cover member and inserting the deflected cover member into the holding space, this operation can be performed reliably and quickly.

As an aspect of the present invention, both the outer regulating portion and the inner regulating portion may be configured as a pair disposed to face each other with respect to the viewing window.

According to an embodiment of the present invention, the holding space is formed as a pair at positions disposed to face each other with respect to the viewing window. Thus, both end sides of the cover member can be inserted into the holding space. The outer regulating portion or the inner regulating portion disposed to face each other can regulate the movement of the cover member toward outside of the device and toward the housing space. The cover member can be therefore stably held in the holding space, Further, as an aspect of the present invention, at least one of the outer regulating portion or the inner regulating portion may be configured by a shape holding portion that holds the cover member in an arc shape protruding in a communication direction of the viewing window.

The term "protruding in a communication direction of the viewing window" includes a case where a projection is convex toward outside of the device and a case where a projection is concave.

The shape holding portion includes a configuration in which at least one of the outer regulating portion and the inner regulating portion has a continuous or discontinuous arc shape, or a configuration in which the outer regulating portion and the inner regulating portion are formed in an arc shape such that the holding space formed between the outer regulating portion and the inner regulating portion is an arc shape.

According to an embodiment of the present invention, since the flexible cover member can be formed in an arc shape, the restoring force is generated on the cover member toward a radial outer side of the arc shape. Meanwhile, since the shape holding portion is configured to hold the shape of the cover member in an arc shape, a part of the cover member spreading toward the radial outer side due to the restoring force interferes with the shape holding portion. As a result, a frictional force is generated between the cover member and the shape holding portion. The cover member is thus held by the shape holding portion.

Specifically, in a case where the shape holding portion is formed of an arc-shaped groove protruding toward outside of the device by the outer regulating portion and the inner regulating portion, the flat plate-shaped cover member is formed in an arc shape along the shape holding portion. As a result, the restoring force toward outside of the device is generated at the cover member.

On the other hand, since the shape holding portion holds the cover member in an arc shape, the cover member is pressed against the shape holding portion by the restoring force. Thus, the frictional force is generated between the cover member and the outer regulating portion. Thus, the cover member is fixed to the viewing window while being held by the shape holding portion. This can prevent the cover member from coming off from the viewing window even when an external force due to, for example, vibration is applied to the cover member, and can prevent foreign matter from entering the housing space.

Further, as an aspect of the present invention, in the shape holding portion, the cover member may be formed in an arc shape protruding toward outside of the device.

According to this embodiment of the invention, even when an external force is applied to the cover member, the cover member can be prevented from entering the housing space.

Specifically, the cover member, which is formed in a convex shape toward outside of the device, has the restoring force toward outside of the device. This can prevent the cover member from entering the housing space side even when an external force is applied to the cover member from outside of the device, Meanwhile, when an external force is applied to the cover member from the housing space side, the movement of the cover member toward outside of the device is regulated by the outer regulating portion, thereby preventing the cover member from easily coming off. Further, even when the cover member comes off, the cover member comes off toward outside of the device, and thus the cover member can be prevented from entering the housing space.

Further, when the viewing window is provided on the rotating side ring plate, the cover member, which is formed in an upward convex shape, hardly retains foreign matter such as dust. This can prevent a reduction in the visibility of the visual window.

Further, as an aspect of the present invention, a guide portion that guides the cover member to the holding space may be formed by the outer regulating portion and the inner regulating portion.

According to the embodiment of the present invention, the cover member, which is guided to the holding space, can be more easily disposed at the viewing window.

Further, as an aspect of the present invention, a locking portion that locks the cover member may be provided.

According to the embodiment of the present invention, the cover member can be locked to the viewing window. Thus, the cover member can be stably held and prevented from coming off. The locking portion includes, for example, a configuration using the restoring force of the cover member, and a configuration in which the cover member is provided with the locking portion separately.

Further, as an aspect of the present invention, the locking portion may be provided in a direction in which the restoring force is applied at a position of the cover member to be locked.

According to the embodiment of the present invention, the cover member can be locked by utilizing the restoring force of the flexible cover member. Thus, the cover member can be locked with a simple configuration.

Further, as an aspect of the present invention, the viewing window may be provided on the rotating side ring plate.

According to the embodiment of the present invention, the FFC housed in the housing space can be confirmed even when the rotary connector device is assembled to a combination switch or the like. That is, the neutral position of the rotating body in an assembled state can be confirmed.

Advantageous Effects of Embodiment

According to the embodiment, a rotary connector device and a method of assembling the rotary connector device capable of preventing a reduction in visibility of a viewing window can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary connector device,
assembling a rotating body and a fixed body so as to be relatively rotatable, the rotating body having a rotating side ring plate in an annular shape and an inner peripheral cylinder portion in a cylindrical shape that is formed at an inner peripheral edge of the rotating side ring plate, the fixed body having a fixed side ring plate in an annular shape and an outer peripheral cylinder portion in a cylindrical shape that is formed at an outer peripheral edge of the fixed side ring plate, and
having a housing space inside,
the rotary connector device comprising:
a viewing window that is a through hole through which the housing space is viewed from outside of the rotary connector device;
a cover member disposed at the viewing window so as to cover the viewing window and being transparent and flexible;
an outer regulating portion facing toward outside of the rotary connector device and disposed so as to contact an outer surface of the cover member; and
an inner regulating portion facing the housing space and disposed so as to be able to contact an inner surface of the cover member,
wherein the cover member is disposed between the outer regulating portion and the inner regulating portion, and
wherein at least one of the outer regulating portion and the inner regulating portion has a shape holding portion that holds the cover member so as to protrude in a penetrating direction in which the through hole penetrates.

2. The rotary connector device according to claim 1,
wherein the outer regulating portion has a first outer regulating portion and a second outer regulating portion that are disposed to face each other with respect to the viewing window, and
a first shortest distance between the first outer regulating portion and the second outer regulating portion is configured to be shorter than a length of the cover member facing the first shortest distance when the cover member is disposed at the viewing window.

3. The rotary connector device according to claim 1,
wherein the inner regulating portion has a first inner regulating portion and a second inner regulating portion that are disposed to face each other with respect to the viewing window, and
a second shortest distance between the first inner regulating portion and the second inner regulating portion is configured to be shorter than a length of the cover member facing the second shortest distance when the cover member is disposed at the viewing window.

4. The rotary connector device according to claim 1, wherein the shape holding portion is configured to hold the cover member so as to protrude in an arc shape toward the penetrating direction.

5. The rotary connector device according to claim 1, wherein the shape holding portion holds the cover member so as to protrude toward outside of the rotary connector device.

6. The rotary connector device according to claim 1, wherein the outer regulating portion and the inner regulating portion have a guide that arranges the cover member at the viewing window.

7. The rotary connector device according to claim 1, wherein the viewing window is provided on the rotating side ring plate.

8. The rotary connector device according to claim 1, wherein the outer regulating portion is configured to contact the cover member when the cover member moves toward outside of the rotary connector device.

9. The rotary connector device according to claim 1, wherein the inner regulating portion is configured such that an inner surface of the cover member contacts the inner regulating portion when the cover member is disposed at the viewing window.

10. The rotary connector device according to claim 1, wherein the outer regulating portion is configured such that an outer surface of the cover member contacts the outer regulating portion when the cover member is disposed at the viewing window.

11. The rotary connector device according to claim 1,
wherein the inner regulating portion is configured such that an inner side surface of the cover member contacts the inner regulating portion when the cover member is disposed at the viewing window, and
the outer regulating portion is configured such that an outer surface of the cover member contacts the outer regulating portion when the cover member is disposed at the viewing window.

12. The rotary connector device according to claim 1, wherein a locking portion that locks the cover member is provided.

13. The rotary connector device according to claim 12, wherein the locking portion is provided in a direction in which a restoring force of the cover member is applied.

14. A method of assembling a rotary connector device, comprising the steps of:
assembling a rotating body and a fixed body to be relatively rotatable so as to have a housing space inside;
providing a viewing window that is a through hole through which the housing space is viewed from outside of the rotary connector device;
providing an outer regulating portion and an inner regulating portion on a periphery of the viewing window; and
passing a cover member that is transparent and flexible through the outer regulating portion while being deflected to arrange the cover member between the outer regulating portion and the inner regulating portion so as to cover the viewing window,
wherein the outer regulating portion can contact an outer surface of the cover member facing toward outside of the rotary connector device,
wherein the inner regulating portion can contact an inner surface of the cover member facing the housing space, and
wherein at least one of the outer regulating portion and the inner regulating portion has a shape holding portion that holds the cover member so as to protrude in a penetrating direction in which the through hole penetrates.

15. A rotary connector device comprising:
a fixed body;
a rotating body assembled to the fixed body to be relatively rotatable so as to have a housing space inside;
a viewing window that is a through hole through which the housing space is viewed from outside of the rotary connector device;
a cover member disposed at the viewing window so as to cover the viewing window and being transparent and flexible;
an outer regulating portion facing toward outside of the rotary connector device and disposed so as to contact an outer surface of the cover member; and
an inner regulating portion facing the housing space and disposed so as to be able to contact an inner surface of the cover member,
wherein the cover member is disposed between the outer regulating portion and the inner regulating portion, and
wherein at least one of the outer regulating portion and the inner regulating portion has a shape holding portion that holds the cover member so as to protrude in a penetrating direction in which the through hole penetrates.

16. The rotary connector device according to claim 15,
wherein the outer regulating portion has a first outer regulating portion and a second outer regulating portion that are disposed to face each other with respect to the viewing window, and
a first shortest distance between the first outer regulating portion and the second outer regulating portion is configured to be shorter than a length of the cover member facing the first shortest distance when the cover member is disposed at the viewing window.

17. The rotary connector device according to claim 15,
wherein the inner regulating portion has a first inner regulating portion and a second inner regulating portion that are disposed to face each other with respect to the viewing window, and
a second shortest distance between the first inner regulating portion and the second inner regulating portion is configured to be shorter than a length of the cover member facing the second shortest distance when the cover member is disposed at the viewing window.

18. The rotary connector device according to claim 15, wherein the shape holding portion is configured to hold the cover member so as to protrude in an arc shape toward the penetrating direction.

19. The rotary connector device according to claim 15, wherein the shape holding portion holds the cover member so as to protrude toward outside of the rotary connector device.

20. The rotary connector device according to claim 15, wherein the outer regulating portion and the inner regulating portion have a guide that arranges the cover member at the viewing window.

* * * * *